United States Patent
Denneman et al.

[11] Patent Number: 5,182,503
[45] Date of Patent: * Jan. 26, 1993

[54] LOW PRESSURE MERCURY DISCHARGE LAMP CIRCUIT ARRAGEMENT

[75] Inventors: Jan W. Denneman, Turnhout, Belgium; Leonardus U. E. Konings, Eindhoven, Netherlands

[73] Assignee: U.S. Philips Corporation, New York, N.Y.

[*] Notice: The portion of the term of this patent subsequent to Nov. 17, 2009 has been disclaimed.

[21] Appl. No.: 639,501

[22] Filed: Jan. 9, 1991

[30] Foreign Application Priority Data

Jan. 29, 1990 [NL] Netherlands ............ 9000198

[51] Int. Cl.$^5$ ............................................. H05B 41/36
[52] U.S. Cl. ................................. 315/224; 315/287; 315/307; 315/209 R
[58] Field of Search ......... 315/224, 287, 307, DIG. 2, 315/DIG. 4, DIG. 7, 209 R, 289, 244, 208, 225

[56] References Cited

U.S. PATENT DOCUMENTS

| | | | |
|---|---|---|---|
| 4,156,166 | 5/1979 | Shapiro et al. | 315/224 X |
| 4,170,747 | 10/1979 | Holmes | 315/307 |
| 4,219,760 | 8/1980 | Ferro | 315/DIG. 4 X |
| 4,358,716 | 11/1982 | Cordes et al. | 315/DIG. 7 X |
| 4,777,409 | 10/1988 | Tracy et al. | 315/224 X |
| 4,885,508 | 12/1989 | Krokaugger | 315/287 |
| 4,937,501 | 6/1990 | Ganser et al. | 315/209 R |
| 5,003,231 | 3/1991 | Perper | 315/307 X |

*Primary Examiner*—Eugene R. LaRoche
*Assistant Examiner*—Ali Neyzari
*Attorney, Agent, or Firm*—Edward Blocker

[57] ABSTRACT

A circuit arrangement suitable for operating a low pressure mercury discharge lamp by means of a high-frequency pulsatory current comprising circuitry for generating a high-frequency pulsatory current from a supply voltage with a modulator for modulating the high-frequency pulsatory current into a substantially square-wave shape voltage with a current amplitude A, with a modulation frequency f and a duty cycle DC together with circuitry for adjusting the duty cycle DC and circuitry for adjusting the amplitude A.

6 Claims, 2 Drawing Sheets

LOW PRESSURE MERCURY DISCHARGE LAMP CIRCUIT ARRAGEMENT

The invention relates to a circuit arrangement suitable for operating a low-pressure mercury discharge lamp by means of a high-frequency pulsatory current comprising
circuitry for generating the high-frequency pulsatory current with an amplitude A from a supply voltage,
a modulator for modulation into a substantially square-wave shape of the high-frequency pulsatory current with a modulation frequency f and a duty cycle DC, and
circuitry for adjusting the duty cycle DC.

A circuit arrangement as described in the opening paragraph is known from U.S. Pat. No. 4,219,760. In the known circuit arrangement, the luminous flux of the lamp can be adjusted through adjustment of the duty cycle DC while the modulation frequency f and amplitude A remain constant. The lamp operated in this way has a relatively high luminous efficacy also at a low value of the duty cycle DC.

A change in the duty cycle DC, however, not only influences the luminous flux but also the colour point of the light radiated by the lamp, which is regarded as unpleasant in many applications.

The invention has for its object to provide a circuit arrangement with which the colour point of the light radiated by the lamp is to a high degree independent of the value of the luminous flux of the lamp.

According to the invention, a circuit arrangement as described in the opening paragraph is for this purpose characterized in that the circuit arrangement is furthermore provided with circuitry for adjustment of an amplitude A of the substantially square-wave modulated high-frequency pulsatory current.

It has been found that the colour point of the light radiated by the lamp can be rendered to a high degree independent of the value of the luminous flux through the adjustment of both the amplitude A and the duty cycle DC.

A further advantage of the measure according to the invention is that the colour point of the light radiated by the lamp can be adjusted over a wide range, at a chosen value of the luminous flux, through the adjustment of the amplitude A and the duty cycle DC.

In an advantageous embodiment of a circuit arrangement according to the invention, the circuit arrangement is provided with circuitry for adjusting the modulation frequency f of the substantially square-wave modulated high-frequency pulsatory current. This renders it possible to adjust besides the duty cycle DC and the amplitude A also the modulation frequency f of the substantially square-wave modulated high-frequency pulsatory current for a chosen value of the luminous flux of the lamp. The range over which the colour point can be adjusted for a chosen value of the luminous flux of the lamp is increased by this.

The substantially square-wave modulated pulsatory current may be either unipolar or bipolar. In the former case it is usually desirable to commute the current through the lamp at a low frequency.

A circuit arrangement according to the invention is suitable for operating low-pressure mercury discharge lamps of various types, such as, for example, compact low-pressure mercury discharge lamps, conventional tubular low-pressure mercury discharge lamps and electrodeless low-pressure mercury discharge lamps.

The invention will be explained in more detail with reference to a drawing of an embodiment.

In the drawing

Figure 1:
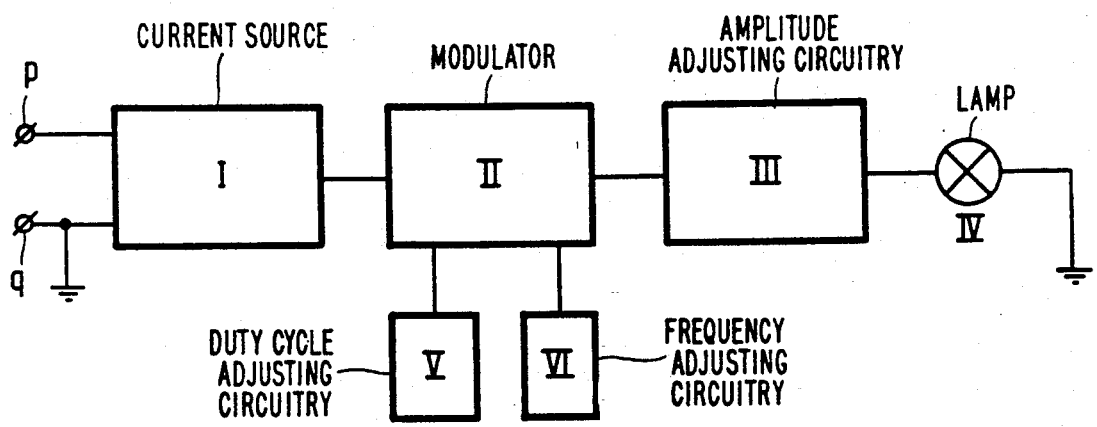
FIG. 1 shows a diagrammatic picture of the build-up of an embodiment of a circuit arrangement according to the invention and a lamp to be operated with it.

The build-up of the circuit arrangement according to the invention shown in FIG. 1 is as follows.

P and Q are connection terminals suitable for being connected to a supply voltage source. I represents a current source which generates a high-frequency pulsatory current from the supply voltage. An output of the current source I is connected to an input of modulator II, which modulates the high-frequency pulsatory current into substantially a square-wave shape with a modulation frequency f and a duty cycle DC. An output of modulator II is connected to an input of circuit arrangement III with which an amplitude A of the substantially square-wave modulated current can be adjusted. A low-pressure mercury discharge lamp IV is connected between an output of the circuit arrangement III and an earth terminal. V and VI are a circuit arrangement for adjusting the duty cycle DC and a circuit arrangement for adjusting the modulation frequency f, respectively. An output of the circuit arrangement V for adjusting the duty cycle DC is connected to an input of modulator II, while similarly an output of the circuit arrangement VI for adjusting the modulation frequency f is connected to a further input of modulator II.

Figure 2:
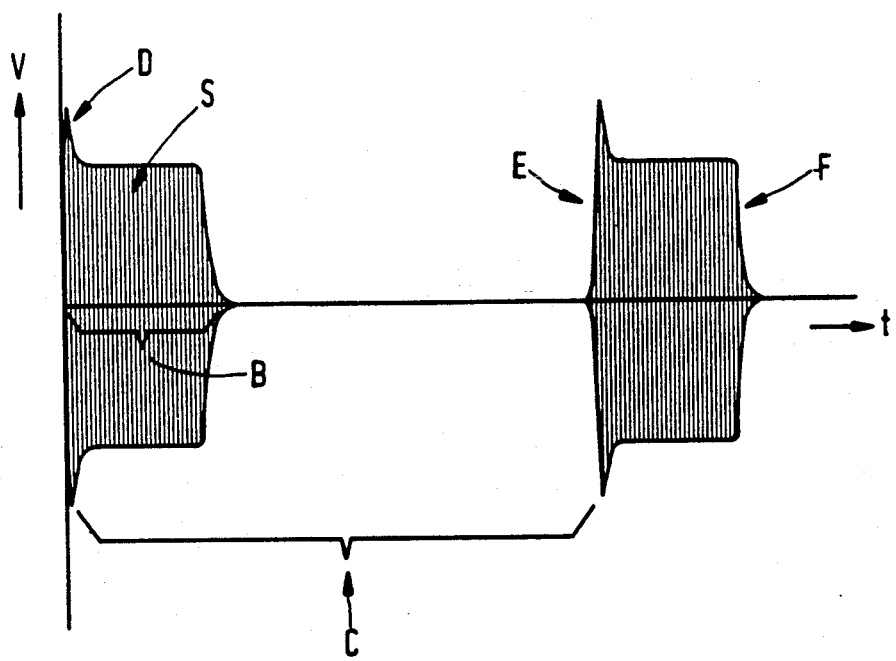
FIG. 2 shows the shape of a lamp voltage of a lamp operated with the circuit arrangement of FIG. 1.

The lamp voltage of the lamp IV is shown in FIG. 2 as a function of time.

The time dimension is plotted on a horizontal axis and the voltage dimension on a vertical axis. S is a high-frequency substantially square-wave modulated voltage which is present across the lamp when the lamp is operated by means of a high-frequency substantially square-wave modulated pulsatory current. B is the width of one square wave and C is a cycle of the substantially square-wave modulation. The cycle C is related to a modulation frequency f in the following way: $C=1/f$. The duty cycle DC is related to the square wave width B and the cycle C in the following way: $DC = B/C$. The square wave width B, cycle C, duty cycle DC, and modulation frequency f of the high-frequency substantially square-wave modulated pulsatory current across the lamp are equal to the corresponding quantities of the high-frequency substantially square-wave modulated pulsatory current. An increased amplitude of the high-frequency voltage pulses D is the result of the ignition of the lamp at the beginning of each square wave. E and F are a rising and a trailing edge, respectively, of the substantially square-wave modulation.

Figure 3:
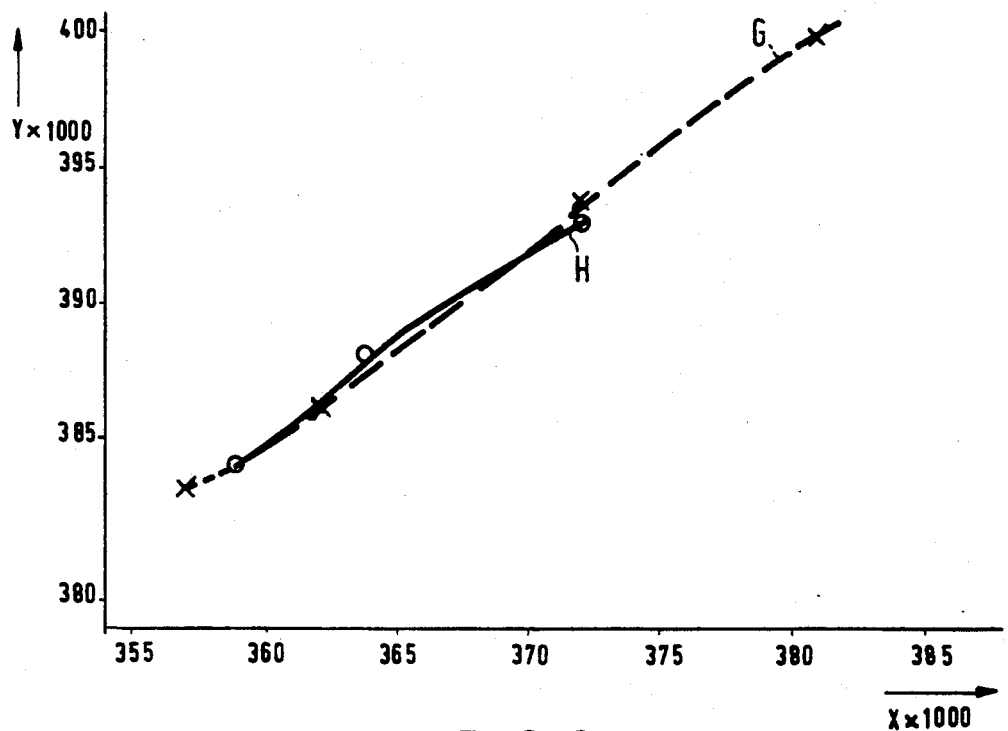
FIG. 3 shows colour points of the lamp operated with the circuit arrangement of FIG. 1 for various luminous flux values.

FIG. 3 shows various colour point settings for various luminous flux values of the lamp IV, in this case an electrodeless low-pressure mercury lamp.

Part of the colour triangle is represented in FIG. 3. Herein curve G represents the range in which the colour point of the lamp was varied by adjustment of the duty cycle DC and the amplitude A of the substantially square-wave modulated high-frequency current pulses with which the lamp was operated, while the luminous flux remained constant. The modulation frequency f was 1 kHz and the luminous flux 1000 lumens. H represents the range in which the colour point of the same lamp was varied in a similar manner by adjustment of the duty cycle DC and the amplitude A at a modulation frequency of 1 kHz and a luminous flux of 3000 lumens.

Since the curves G and H practically coincide, there is for each colour point on curve H a substantially coinciding colour point on curve G. This illustrates that the colour point of the lamp is to a high degree independent of the value of the luminous flux through adjustment of the duty cycle DC and the amplitude A.

The curves G and H illustrate each individually that it is possible to adjust the colour point of the lamp over a wide range for a chosen value of the luminous flux. The lamp was provided with a spherical lamp vessel having a diameter of approximately 110 mm, into which argon was introduced with a filling pressure of 33 Pa (at 300 K). A quantity of amalgam consisting of mercury, bismuth and indium was also present in the lamp vessel. The wall of the lamp vessel was provided with a luminescent layer comprising a mixture of red luminescing yttrium oxide activated by Eu (3+), green luminescing cerium-magnesium aluminate activated by Tb (3+) and blue luminescing barium-magnesium aluminate activated by Eu (2+). The frequency of the high-frequency current pulses was 2.65 MHz. The results shown in FIG. 4 were obtained with the same lamp.

Figure 4:
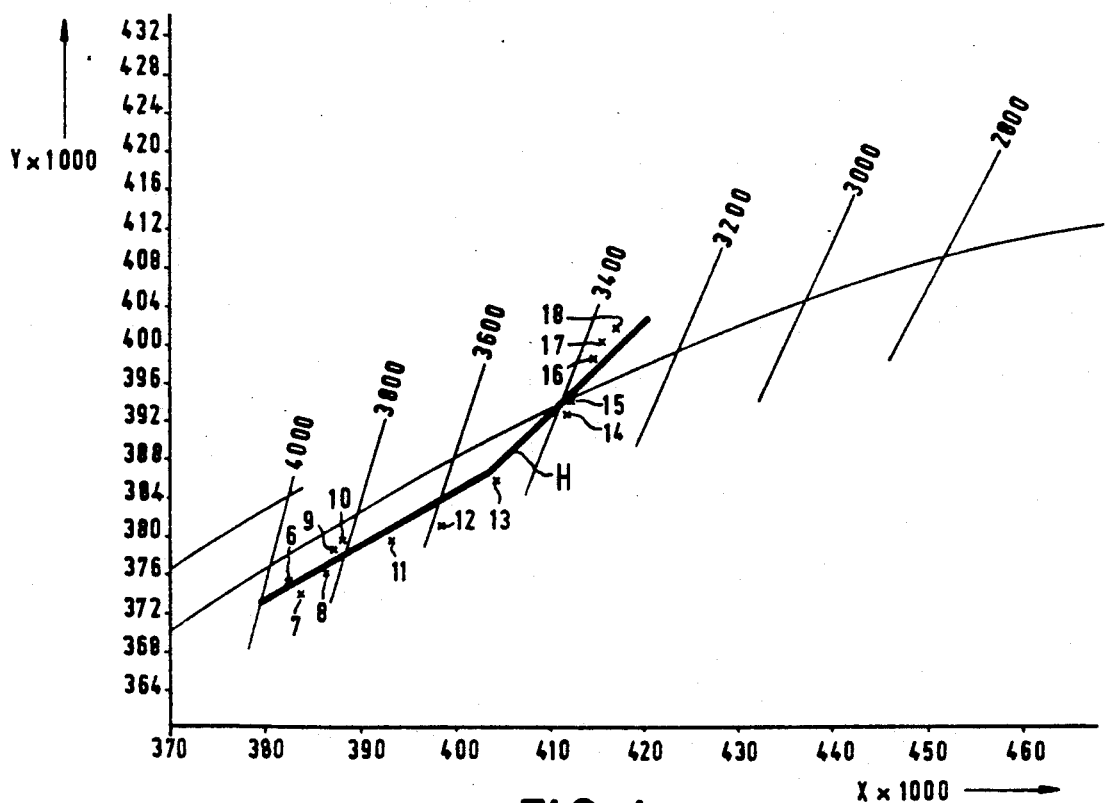
FIG. 4 shows colour points of the lamp operated with the circuit arrangement of FIG. 1 at a given luminous flux.

FIG. 4 shows various colour point settings of the lamp at the same luminous flux.

In FIG. 4, the points 6 to 18 are different colour points of the light radiated by the lamp realized at a constant luminous flux of 1000 lumens through adjustment of the duty cycle DC, the modulation frequency f, and the amplitude A of the substantially square-wave modulated high-frequency pulsatory current.

The curve H approximates the path over which the colour point was varied. In the present case such settings of the three parameters were chosen that each colour point on the curve H is experienced by the human eye as a pleasant colour, while following of the curve H from left to right corresponds to a transition from "cool white" to "warm white" light. The curve H illustrates the possibility of adjusting the colour point over a wide range for a given luminous flux of the lamp.

We claim:

1. A circuit arrangement suitable for operating a low pressure mercury discharge lamp by means of a high-frequency pulsatory current, comprising circuitry for generating the high-frequency pulsatory current from a supply voltage, a modulator for modulating the high-frequency pulsatory current into a substantially square-wave shaped voltage with an amplitude A, a modulation frequency f and a duty cycle DC, said circuit arrangement being provided with circuitry for adjusting the amplitude A of the substantially square-wave shaped voltage, and means for applying an adjusted square-wave shaped voltage to said lamp to obtain a selected color point for said lamp.

2. A circuit arrangement suitable for operating a low pressure mercury discharge lamp by means of a high frequency pulsatory current, comprising circuitry for generating the high frequency pulsatory current from a supply voltage, a modulator for modulating the high frequency pulsatory current into a substantially square-wave shaped voltage with a amplitude A, a modulation frequency f and a duty cycle DC, said circuit arrangement being provided with circuitry for adjusting the duty cycle DC and wherein the circuit arrangement is provided with circuitry for adjusting the amplitude A of the substantially square-wave shaped voltage and means for applying such an adjusted square-wave shaped voltage to said lamp to obtain a selected color point for said lamp.

3. A method for controlling the color point of a low pressure mercury discharge lamp substantially independent of the luminous flux of the lamp, said method comprising generating a high-frequency pulsatory current from a supply voltage, modulating the high-frequency pulsatory current into a substantially square-wave shaped voltage with an amplitude A, a modulation frequency f and a duty cycle DC, said method including adjusting the amplitude A of the substantially square-wave shaped voltage appropriately and applying said adjusted voltage to said lamp to obtain a selected color point.

4. A method in accordance with claim 3, said method also including adjusting the duty cycle DC of the substantially square-wave shaped voltage before applying said adjusted voltage to said lamp.

5. A method for increasing the range through which the color point of a low pressure mercury discharge lamp can be adjusted at a constant luminous lamp flux, said method comprising generating a high-frequency pulsatory current from a supply voltage, modulating the high-frequency pulsatory current into a substantially square-wave shaped voltage with an amplitude A, a modulation frequency f and a duty cycle DC, said method including adjusting the amplitude A of the substantially square-wave shaped voltage appropriately and applying said adjusted voltage to said lamp to obtain a selected color point.

6. A method for increasing the range through which the color point of a low pressure mercury discharge lamp can be adjusted at a constant luminous lamp flux in accordance with claim 5, said method also including adjusting the duty cycle DC of the substantially square-wave shaped voltage before applying said adjusted voltage to said lamp.

* * * * *

UNITED STATES PATENT AND TRADEMARK OFFICE
CERTIFICATE OF CORRECTION

PATENT NO. : 5,182,503
DATED : January 26, 1993
INVENTOR(S) : Denneman, et al

It is certified that error appears in the above-indentified patent and that said Letters Patent is hereby corrected as shown below:

Column 4, line 12, change "a" to --an--.

Signed and Sealed this

Sixth Day of August, 1996

Attest:

BRUCE LEHMAN

Attesting Officer

Commissioner of Patents and Trademarks